(12) United States Patent
Hanrahan et al.

(10) Patent No.: US 11,268,444 B2
(45) Date of Patent: Mar. 8, 2022

(54) TURBINE COOLING ARRANGEMENT

(71) Applicant: United Technologies Corporation, Farmington, CT (US)

(72) Inventors: Paul R. Hanrahan, Farmington, CT (US); Jonathan Ortiz, Torrance, CA (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 284 days.

(21) Appl. No.: 15/599,149

(22) Filed: May 18, 2017

(65) Prior Publication Data

US 2018/0334961 A1 Nov. 22, 2018

(51) Int. Cl.
*F02C 6/08* (2006.01)
*F02C 7/18* (2006.01)
(Continued)

(52) U.S. Cl.
CPC ............... *F02C 7/18* (2013.01); *F01D 5/081* (2013.01); *F01D 9/02* (2013.01); *F02C 3/04* (2013.01);
(Continued)

(58) Field of Classification Search
CPC .... F02C 6/08; F02C 7/18; F02C 7/185; F02C 9/18
See application file for complete search history.

(56) References Cited

U.S. PATENT DOCUMENTS 4,254,618 A * 3/1981 Elovic ................ F28D 21/0014
60/226.1
4,497,445 A * 2/1985 Adkins ................ F04D 27/009
239/590
(Continued)

FOREIGN PATENT DOCUMENTS

EP 0290372 A1 11/1988
EP 2927426 A1 10/2015
(Continued)

OTHER PUBLICATIONS

Extended European Search Report for EP Application No. 18173367.6; Report dated Oct. 15, 2018 (9 pages).

*Primary Examiner* — Scott J Walthour
*Assistant Examiner* — Todd N Jordan
(74) *Attorney, Agent, or Firm* — Cantor Colburn LLP

(57) ABSTRACT

A cooling system for a component of a gas turbine engine includes a first airflow passage configured to direct a first airflow to a mixing chamber and a second airflow passage to configured direct a second airflow to the mixing chamber, the second airflow having a higher temperature than the first airflow, and a cooling airflow passage to direct a cooling airflow from the mixing chamber to the component, the cooling airflow comprising the first airflow and the second airflow. The airflow passages are configured and sized to allow an amount of cooling airflow for unrestricted engine operation. When the first airflow passage is disabled, the second airflow passage and cooling airflow passage are configured and sized to allow an amount of cooling airflow which is adequate to permit continued safe engine operation restricted to within only a portion of its normal parameters and operating envelope.

8 Claims, 2 Drawing Sheets

US 11,268,444 B2
Page 2

(51) Int. Cl.
*F02C 3/04* (2006.01)
*F02C 9/18* (2006.01)
*F01D 9/02* (2006.01)
*F01D 5/08* (2006.01)
*F02K 3/06* (2006.01)

(52) U.S. Cl.
CPC ............ *F02C 6/08* (2013.01); *F02C 7/185* (2013.01); *F02C 9/18* (2013.01); *F02K 3/06* (2013.01); *F05D 2220/32* (2013.01); *F05D 2240/24* (2013.01); *F05D 2240/35* (2013.01); *F05D 2260/213* (2013.01)

(56) References Cited

U.S. PATENT DOCUMENTS

| | | | | | |
|---|---|---|---|---|---|
| 4,807,433 | A * | 2/1989 | Maclin | ............... | F01D 5/081 415/115 |
| 5,297,386 | A * | 3/1994 | Kervistin | ............... | F01D 11/24 60/226.1 |
| 6,612,114 | B1 * | 9/2003 | Klingels | ............... | F01D 5/187 60/785 |
| 6,672,072 | B1 * | 1/2004 | Giffin, III | ............... | F02C 7/14 60/782 |
| 8,307,662 | B2 | 11/2012 | Turco | | |
| 8,757,508 | B2 * | 6/2014 | Haasz | ............... | F16K 31/002 236/102 |
| 9,366,194 | B2 * | 6/2016 | Feigl | ............... | F02C 9/18 |
| 2013/0219917 | A1 * | 8/2013 | Suciu | ............... | F01D 5/081 60/782 |
| 2013/0219920 | A1 * | 8/2013 | Suciu | ............... | F02C 6/08 60/782 |
| 2015/0285147 | A1 * | 10/2015 | Phillips | ............... | F01D 25/125 60/726 |
| 2015/0322865 | A1 | 11/2015 | Scipio et al. | | |
| 2015/0322866 | A1 | 11/2015 | Scipio et al. | | |
| 2015/0354465 | A1 * | 12/2015 | Suciu | ............... | F02C 3/04 60/782 |
| 2015/0354822 | A1 * | 12/2015 | Suciu | ............... | F23R 3/10 60/772 |
| 2016/0003149 | A1 * | 1/2016 | Suciu | ............... | F02C 7/06 60/772 |
| 2016/0084502 | A1 * | 3/2016 | Cunha | ............... | F02C 7/04 60/772 |
| 2016/0090914 | A1 * | 3/2016 | Lyons | ............... | F01D 25/08 60/772 |
| 2016/0177830 | A1 * | 6/2016 | Guardi | ............... | F01D 5/18 60/782 |
| 2016/0201688 | A1 * | 7/2016 | Lyons | ............... | F01D 9/065 60/751 |
| 2016/0230661 | A1 * | 8/2016 | Merry | ............... | F01D 5/081 |
| 2017/0037782 | A1 | 2/2017 | Schwarz et al. | | |
| 2018/0291760 | A1 * | 10/2018 | Ortiz | ............... | F01D 11/20 |
| 2018/0291762 | A1 * | 10/2018 | Ortiz | ............... | F01D 25/12 |
| 2018/0347472 | A1 * | 12/2018 | Ortiz | ............... | F02C 9/18 |

FOREIGN PATENT DOCUMENTS

| | | |
|---|---|---|
| EP | 2998519 A1 | 3/2016 |
| EP | 3358152 A1 | 8/2018 |
| WO | WO-2015142799 A1 * | 9/2015 |

* cited by examiner

TURBINE COOLING ARRANGEMENT

BACKGROUND

Exemplary embodiments pertain to the art of gas turbine engines. More particularly, the present disclosure relates to cooling of turbine components for gas turbine engines.

Gas turbine engines are known and typically include a fan delivering air into a bypass duct as propulsion air. Further, the fan delivers air into a compressor section where it is compressed. The compressed air passes into a combustion section where it is mixed with fuel and ignited. Products of this combustion pass downstream over turbine rotors driving them to rotate.

In a gas turbine engine, cooling air is often provided from the compressor to the turbine section to reduce component temperature in the turbine section and improve overall gas turbine engine operation. In some gas turbine engines, air from the high compressor discharge is passed through a heat exchanger, which may be located in a fan bypass duct and then delivered into the turbine section as cooling air, often via a tangential onboard injector (TOBI).

The heat exchangers, however, are often prone to blockage, which limits or stops cooling airflow through the TOBI and to the turbine components for cooling. Reduction in or stoppage of such flow from the heat exchanger can lead to overtemperature conditions of the turbine components and reduction of performance of the turbine.

BRIEF DESCRIPTION

In one embodiment, a cooling system for a component of a gas turbine engine includes a first airflow passage configured to direct a first airflow to a mixing chamber and a second airflow passage to configured direct a second airflow to the mixing chamber, the second airflow having a higher temperature than the first airflow, and a cooling airflow passage to direct a cooling airflow from the mixing chamber to the component, the cooling airflow comprising the first airflow and the second airflow. The first airflow passage, the second airflow passage, and the cooling airflow passage are configured and sized to allow an amount of cooling airflow for unrestricted engine operation within its normal parameters and operating envelope. When the first airflow passage is disabled, the second airflow passage and cooling airflow passage are configured and sized to allow an amount of cooling airflow which is adequate to permit continued safe engine operation restricted to within only a portion of its normal parameters and operating envelope.

Additionally or alternatively, in this or other embodiments the disabling of the first airflow passage is due to a failure, whereby the continued safe engine operation is a safety feature.

Additionally or alternatively, in this or other embodiments the disabling of the first airflow passage is a control feature, whereby the continued safe engine operation with lesser cooling airflow is an improvement in engine efficiency.

Additionally or alternatively, in this or other embodiments a heat exchanger is configured to lower a temperature of the first airflow prior to entering the mixing chamber.

Additionally or alternatively, in this or other embodiments the first airflow is directed from a compressor section of the gas turbine engine via a bleed port.

Additionally or alternatively, in this or other embodiments the second airflow is directed from a diffuser of the gas turbine engine.

Additionally or alternatively, in this or other embodiments the component is a turbine rotor of the gas turbine engine.

Additionally or alternatively, in this or other embodiments a second airflow inlet to the mixing chamber and the cooling passage outlet are configured to prevent backflow of hot combustion gases into the turbine rotor.

In another embodiment, a gas turbine engine includes a compressor section, a combustor section, a turbine section, and a cooling system for a turbine rotor of the turbine section. The cooling system includes a first airflow passage configured to direct a first airflow to a mixing chamber, a second airflow passage to configured direct a second airflow to the mixing chamber, the second airflow having a higher temperature than the first airflow, and a cooling airflow passage to direct a cooling airflow from the mixing chamber to the turbine rotor, the cooling airflow comprising the first airflow and the second airflow, the cooling airflow passage having a cooling passage outlet to direct the cooling airflow into a cooling airflow opening in the turbine rotor. The first airflow passage, the second airflow passage, and the cooling airflow passage are configured and sized to allow an amount of cooling airflow for unrestricted engine operation within its normal parameters and operating envelope. When the first airflow passage is disabled, the second airflow passage and cooling airflow passage are configured and sized to allow an amount of cooling airflow which is adequate to permit continued safe engine operation restricted to within only a portion of its normal parameters and operating envelope.

Additionally or alternatively, in this or other embodiments the disabling of the first airflow passage is due to a failure, whereby the continued safe engine operation is a safety feature.

Additionally or alternatively, in this or other embodiments the disabling of the first airflow passage is a control feature, whereby the continued safe engine operation with lesser cooling airflow is an improvement in engine efficiency.

Additionally or alternatively, in this or other embodiments the cooling airflow passage is formed in a tangential onboard injector of the gas turbine engine.

Additionally or alternatively, in this or other embodiments a heat exchanger is configured to lower a temperature of the first airflow prior to entering the mixing chamber.

Additionally or alternatively, in this or other embodiments the first airflow is directed from the compressor section of the gas turbine engine via a bleed port.

Additionally or alternatively, in this or other embodiments the second airflow is directed from a diffuser of the gas turbine engine.

Additionally or alternatively, in this or other embodiments a second airflow inlet to the mixing chamber and the cooling passage outlet are configured to prevent backflow of hot combustion gases into the turbine rotor.

In yet another embodiment, a method of cooling a component of a gas turbine engine includes urging a first airflow into a mixing chamber, urging a second airflow into the mixing chamber, the second airflow having a higher temperature than the first airflow, and flowing a cooling airflow comprising the first airflow and the second airflow from the mixing chamber through a cooling airflow passage toward the component. The first airflow passage, the second airflow passage, and the cooling airflow passage are configured and sized to allow an amount of cooling airflow for unrestricted engine operation within its normal parameters and operating envelope. When the first airflow passage is disabled, the second airflow passage and cooling airflow passage are configured and sized to allow an amount of cooling airflow which is adequate to permit continued safe engine operation restricted to within only a portion of its normal parameters and operating envelope.

Additionally or alternatively, in this or other embodiments the first airflow is urged from a compressor section of the gas turbine engine to the mixing chamber.

Additionally or alternatively, in this or other embodiments the first airflow is passed through a heat exchanger to cool the first airflow prior to entering the mixing chamber.

Additionally or alternatively, in this or other embodiments the second airflow is urged from a diffuser of the gas turbine engine to the mixing chamber.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
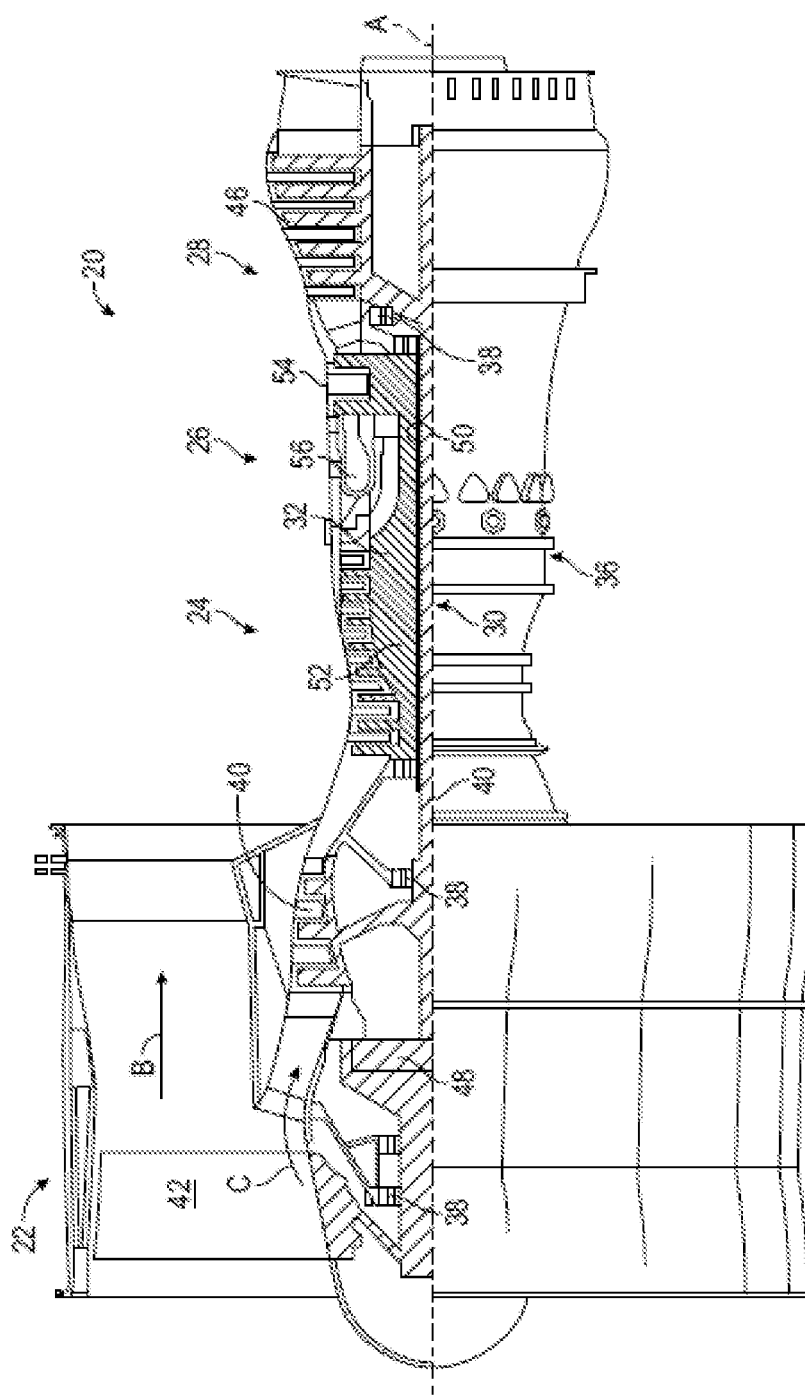
FIG. 1 is cross-sectional view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
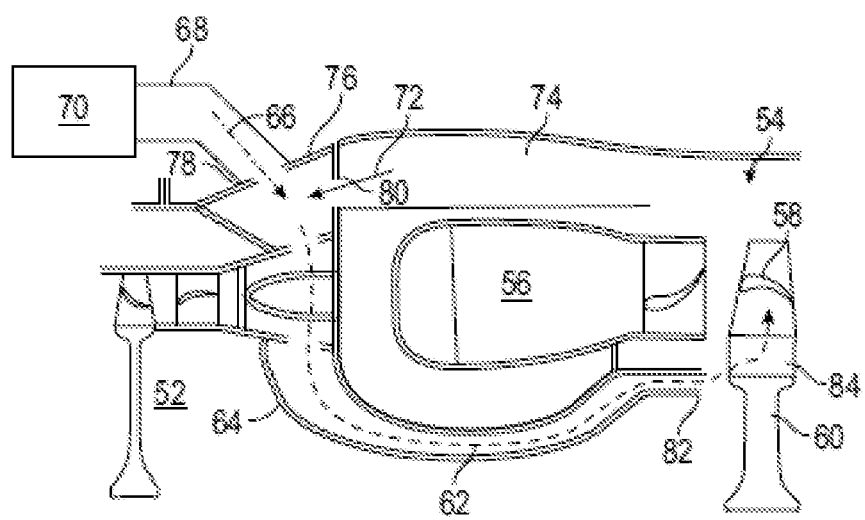
FIG. 2 is a schematic view of an embodiment of a cooling system for a gas turbine engine.

Referring now to FIG. 2, a cross-sectional view of a portion of the gas turbine engine 10 is illustrated, showing a cooling scheme for turbine airfoils 58 of a high pressure turbine rotor 60. Cooling airflow 62 is provided to the high pressure turbine rotor 60 via a tangential onboard injector (TOBI) 64.

Cooling airflow 62 includes first airflow 66 diverted from the compressor section 24 via a bleed duct 68 and passed through a heat exchanger 70 to lower a temperature of the first airflow 66. Cooling airflow 62 further includes second airflow 72, which is diverted from a diffuser 74. The first airflow 66 and the second airflow 72 are each directed into a mixing chamber 76. The first airflow 66 enters the mixing chamber 76 through a first opening 78, while the second airflow 72 enters the mixing chamber 76 through a second opening 80. From the mixing chamber 76, the combined first airflow 66 and second airflow 72 proceed as cooling airflow 62 through the TOBI 64 toward the turbine rotor 60. The TOBI 64 includes one or more TOBI exits 82 through which the cooling airflow 62 is urged into a turbine rotor opening 84. The cooling airflow 62 then proceeds through passages (not shown) in the turbine rotor 60 to cool the turbine rotor 60, more particularly, turbine airfoils 58. The first opening 78, the second opening 80 and the TOBI exit 82 are all sized and configured such that the mixed cooling airflow 62 keeps the turbine airfoils 58 below a maximum operating temperature, or other temperature threshold during normal operation of the gas turbine engine.

Figure 3:
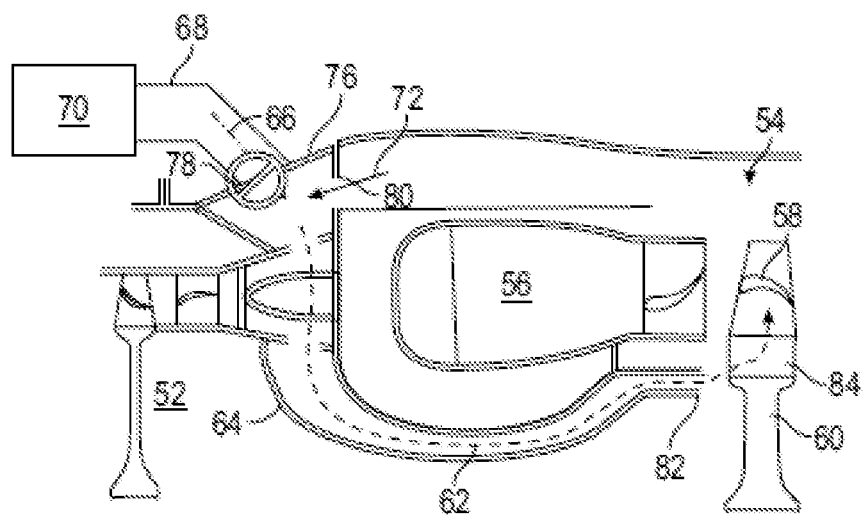
FIG. 3 is another schematic view of an embodiment of a cooling system for a gas turbine engine.

Referring now to FIG. 3, in some operating conditions, first airflow 66 may be impeded or stopped due to, for example, blockage of the heat exchanger 70 or other conditions. In such instances, the cooling airflow 62 includes the second airflow 72 with a substantially reduced amount of first airflow 66 or no first airflow 66 at all. To allow for part power or "turn down" operation of the gas turbine engine 10, the second opening 80 and the TOBI exit 82 are sized and configured provide enough cooling airflow 62 pressure to the turbine rotor 60 to prevent backflow of hot combustion gases 84 into the turbine rotor 60 during partial power or temperature operation of the gas turbine engine 10, thus preventing damage to the turbine rotor 60 during these conditions. Alternatively, in some embodiments, the stoppage of the first airflow 66 is intentional as a control feature to improve efficiency of the gas turbine engine 10 in certain operating conditions. The arrangement disclosed herein provide a failsafe for continued operation of the gas turbine engine 10 if first airflow 66 is degraded or stopped from the heat exchanger 70, thus preventing damage to the turbine rotor 60.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A cooling system for a turbine rotor of a gas turbine engine, comprising:
   a turbine rotor of the gas turbine engine;
   a first airflow passage configured to direct a first airflow to a mixing chamber;
   a second airflow passage configured to direct a second airflow to the mixing chamber, the second airflow having a higher temperature than the first airflow;
   a cooling airflow passage to direct a cooling airflow from the mixing chamber to the turbine rotor, the cooling airflow comprising the first airflow and the second airflow; and
   a heat exchanger configured to lower a temperature of the first airflow prior to entering the mixing chamber;
   wherein the first airflow passage, the second airflow passage, and the cooling airflow passage allow an amount of cooling airflow to cool the turbine rotor during normal operation of the gas turbine engine;
   wherein the second airflow passage and the cooling airflow passage are sized and configured such that when the first airflow through the first airflow passage is stopped, the flow of the second airflow into the mixing chamber via the inlet of the second airflow passage to the mixing chamber and through an outlet of the cooling airflow passage is sufficient to prevent backflow of hot combustion gases into the turbine rotor; and
   wherein the second airflow is directed from a diffuser of the gas turbine engine radially outboard of a combustor plenum of the gas turbine engine, the combustor plenum disposed radially outboard of a combustor of the gas turbine engine.

2. The cooling system of claim 1, wherein the first airflow is directed from a compressor section of the gas turbine engine via a bleed port.

3. A gas turbine engine, comprising:
   a compressor section;
   a combustor section;
   a turbine section; and
   a cooling system for a turbine rotor of the turbine section, including:
   a first airflow passage configured to direct a first airflow to a mixing chamber;
   a second airflow passage configured to direct a second airflow to the mixing chamber, the second airflow having a higher temperature than the first airflow;
   a cooling airflow passage to direct a cooling airflow from the mixing chamber to the turbine rotor, the cooling airflow comprising the first airflow and the second airflow, the cooling airflow passage having a cooling passage outlet to direct the cooling airflow into a cooling airflow opening in the turbine rotor; and
   a heat exchanger configured to lower a temperature of the first airflow prior to entering the mixing chamber;
   wherein the first airflow passage, the second airflow passage, and the cooling airflow passage allow an amount of cooling airflow to cool the turbine rotor during normal operation of the gas turbine engine;

wherein the second airflow passage and the cooling airflow passage are sized and configured such that when the first airflow through the first airflow passage is stopped, the flow of the second airflow into the mixing chamber via the inlet of the second airflow passage to the mixing chamber and through an outlet of the cooling airflow passage is sufficient to prevent backflow of hot combustion gases into the turbine rotor; and wherein the second airflow is directed from a diffuser of the gas turbine engine radially outboard of a combustor plenum of the gas turbine engine, the combustor plenum disposed radially outboard of a combustor of the gas turbine engine.

4. The gas turbine engine of claim 3, wherein the cooling airflow passage includes a tangential onboard injector of the gas turbine engine.

5. The gas turbine engine of claim 3, wherein the first airflow is directed from the compressor section of the gas turbine engine via a bleed port.

6. A method of cooling a turbine rotor of a gas turbine engine, comprising:

urging a first airflow into a mixing chamber;

passing the first airflow through a heat exchanger to cool the first airflow prior to entering the mixing chamber;

urging a second airflow into the mixing chamber, the second airflow having a higher temperature than the first airflow;

flowing a cooling airflow comprising the first airflow and the second airflow from the mixing chamber through a cooling airflow passage toward the turbine rotor;

wherein the first airflow passage, the second airflow passage, and the cooling airflow passage allow an amount of cooling airflow to cool the turbine rotor during normal operation of the gas turbine engine;

wherein the second airflow passage and the cooling airflow passage are sized and configured such that when the first airflow through the first airflow passage is stopped, the flow of the second airflow into the mixing chamber via the inlet of the second airflow passage to the mixing chamber and through an outlet of the cooling airflow passage is sufficient to prevent backflow of hot combustion gases into the turbine rotor; and wherein the second airflow is directed from a diffuser of the gas turbine engine radially outboard of a combustor plenum of the gas turbine engine, the combustor plenum disposed radially outboard of a combustor of the gas turbine engine.

7. The method of claim 6, further comprising urging the first airflow from a compressor section of the gas turbine engine to the mixing chamber.

8. The method of claim 6, further comprising urging the second airflow from a diffuser of the gas turbine engine to the mixing chamber.

* * * * *